United States Patent
Hussain et al.

(10) Patent No.: US 11,539,513 B1
(45) Date of Patent: Dec. 27, 2022

(54) PAUSING A MEDIA ACCESS CONTROL SECURITY (MACSEC) KEY AGREEMENT (MKA) PROTOCOL OF AN MKA SESSION USING A FAST HEARTBEAT SESSION

(71) Applicant: Juniper Networks, Inc., Sunnyvale, CA (US)

(72) Inventors: Baba Syed Mazaz Hussain, Bangalore (IN); Sachin Mutalik Desai, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 1098 days.

(21) Appl. No.: 15/891,089

(22) Filed: Feb. 7, 2018

Related U.S. Application Data

(60) Provisional application No. 62/607,670, filed on Dec. 19, 2017.

(51) Int. Cl.
| | |
|---|---|
| *H04L 29/06* | (2006.01) |
| *H04L 9/08* | (2006.01) |
| *H04L 65/1069* | (2022.01) |
| *H04L 69/324* | (2022.01) |
| *H04L 43/10* | (2022.01) |

(52) U.S. Cl.
CPC .......... *H04L 9/0838* (2013.01); *H04L 9/0891* (2013.01); *H04L 43/10* (2013.01); *H04L 65/1069* (2013.01); *H04L 69/324* (2013.01)

(58) Field of Classification Search
CPC ..... H04L 9/0838; H04L 9/0891; H04L 43/10; H04L 65/1069; H04L 69/324
See application file for complete search history.

(56) References Cited

U.S. PATENT DOCUMENTS

| | | | | |
|---|---|---|---|---|
| 9,692,733 | B2* | 6/2017 | Agarwal | H04L 63/061 |
| 9,807,178 | B2* | 10/2017 | Weis | H04L 67/142 |
| 2007/0217611 | A1* | 9/2007 | Weis | H04L 63/06 380/277 |
| 2009/0080657 | A1* | 3/2009 | Asati | H04L 9/083 380/277 |
| 2010/0287305 | A1* | 11/2010 | Kompella | H04L 43/10 709/238 |

(Continued)

OTHER PUBLICATIONS

NIAP, National Information Assurance, Partnership, MACsec Key Agreement, Sep. 13, 2016.*

*Primary Examiner* — Chau Le

(74) *Attorney, Agent, or Firm* — Harrity & Harrity, LLP

(57) ABSTRACT

A network device may establish a media access control security (MACsec) key agreement (MKA) session with another network device via a MACsec communication link; establish a fast heartbeat session via the MACsec communication link, between a first packet processing engine of the network device and a second packet processing engine of the other network device, where the fast heartbeat session is to permit the first packet processing engine and the second packet processing engine to exchange fast heartbeat messages via the fast heartbeat session and the MACsec communication link; place an MKA protocol of the MKA session in a pause state until the first packet processing engine detects a rekey event; determine that a key for the MKA session is to be regenerated based on detection of the rekey event; and perform an action based on the rekey event for the MKA session.

20 Claims, 8 Drawing Sheets

(56) References Cited

U.S. PATENT DOCUMENTS

| | | | |
|---|---|---|---|
| 2012/0045063 A1* | 2/2012 | Weis | H04L 63/06 |
| | | | 380/277 |
| 2016/0164848 A1* | 6/2016 | Wainner | H04L 63/061 |
| | | | 713/171 |
| 2019/0116183 A1* | 4/2019 | Hussain | H04L 63/08 |

* cited by examiner

PAUSING A MEDIA ACCESS CONTROL SECURITY (MACSEC) KEY AGREEMENT (MKA) PROTOCOL OF AN MKA SESSION USING A FAST HEARTBEAT SESSION

RELATED APPLICATION

This application claims priority under 35 U.S.C. § 119 to U.S. Provisional Patent Application No. 62/607,670, filed on Dec. 19, 2017, the content of which is incorporated by reference herein in its entirety.

BACKGROUND

Media access control security (MACsec) is a security standard, defined by the Institute of Electrical and Electronics Engineers (IEEE) 802.1AE, that defines connectionless data confidentiality and integrity for media access independent protocols. The MACsec standard specifies a set of protocols to meet security requirements for protecting data traversing Ethernet local area networks (LANs). MACsec allows unauthorized LAN connections to be identified and excluded from communication within the network, and defines a security infrastructure to provide data confidentiality, data integrity, and data origin authentication.

SUMMARY

According to some implementations, a network device may include one or more memories, and one or more processors, communicatively coupled to the one or more memories, to establish a media access control security (MACsec) key agreement (MKA) session with another network device via a MACsec communication link; establish a fast heartbeat session via the MACsec communication link, between a first packet processing engine of the network device and a second packet processing engine of the other network device, where the fast heartbeat session is to permit the first packet processing engine and the second packet processing engine to exchange fast heartbeat messages via the fast heartbeat session and the MACsec communication link; place an MKA protocol of the MKA session in a pause state until the first packet processing engine detects a rekey event, where the first packet processing engine, when the MKA protocol is in the pause state, is to: cause an MKA daemon of the network device to suspend transmission of MKA packet data for the MKA session, and cause the MKA daemon to suspend a timeout timer associated with the MKA session; determine that a key for the MKA session is to be regenerated based on detection of the rekey event; and perform an action based on the rekey event for the MKA session.

According to some implementations, a non-transitory computer-readable medium storing instructions that, when executed by one or more processors of a network device, cause the one or more processors to establish a media access control security (MACsec) key agreement (MKA) session with another network device via a MACsec communication link; establish a fast heartbeat session via the MACsec communication link, between a first packet processing engine of the network device and a second packet processing engine of the other network device, where the fast heartbeat session is to permit the first packet processing engine and the second packet processing engine to exchange fast heartbeat messages via the fast heartbeat session and the MACsec communication link; place an MKA protocol of the MKA session in a pause state, where the first packet processing engine, when the MKA protocol is in the pause state, is to cause an MKA daemon of the network device to suspend transmission of MKA packet data for the MKA session, and cause the MKA daemon to suspend a timeout timer associated with the MKA session; detect a rekey event associated with the MKA session; determine that a key for the MKA session is to be regenerated based on detecting the rekey event; and perform an action based on the rekey event for the MKA session, the action including placing the MKA protocol in an active state.

According to some implementations, a method may include establishing, by a network device, a media access control security (MACsec) key agreement (MKA) session with another network device via a MACsec communication link; establishing, by the network device, a fast heartbeat session via the MACsec communication link, where the fast heartbeat session is to permit the network device and the other network device to exchange fast heartbeat messages via the fast heartbeat session and the MACsec communication link; and placing, by the network device, an MKA protocol of the MKA session in a pause state until a rekey event is detected; suspending, by the network device and after the MKA protocol is placed in the pause state, transmission of MKA packet data for the MKA session; and suspending, by the network device, a timeout timer associated with the MKA session.

DETAILED DESCRIPTION

Figure 1A:
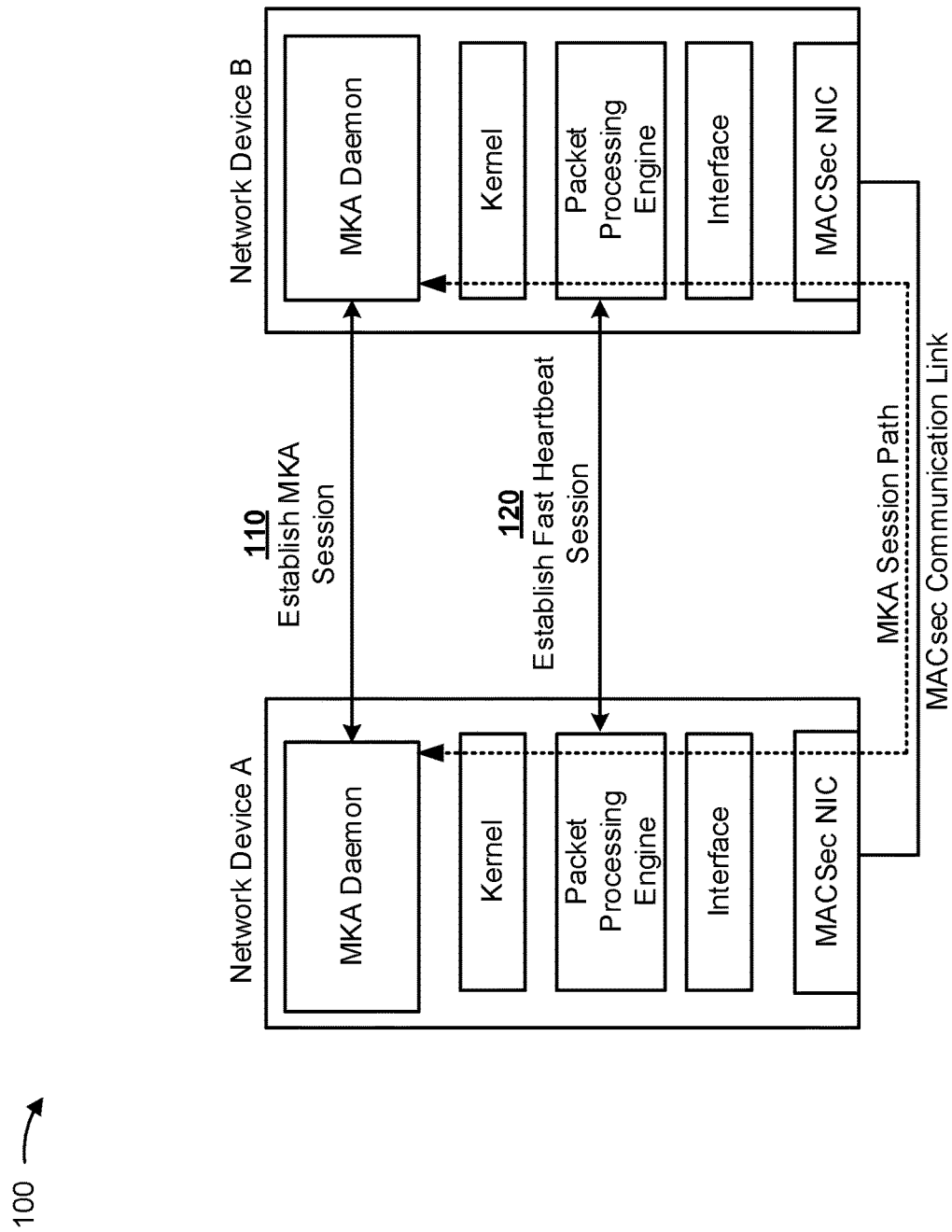
FIGS. 1A-1C are diagrams of an overview of an example implementation described herein.

The following detailed description of example implementations refers to the accompanying drawings. The same reference numbers in different drawings may identify the same or similar elements.

In a media access control security (MACsec) key agreement (MKA) protocol, at least two peer network devices may communicate via an MKA session over a MACsec communication link. The MKA session may be secured via keys generated and/or maintained by MKA daemons of the peer network devices. During MKA sessions, peer liveness or availability may be monitored via peer liveness messages (e.g., heartbeat messages) exchanged between the MKA daemons of MKA devices at a regular transmit interval (e.g., two or more seconds). In some instances, the MKA protocol may implement a timeout interval for MKA sessions (e.g., an interval approximately two times or three times the transmit interval) to wait for peer liveness or availability before determining that the peer network device has been disconnected from the MACsec communication link or has ended the MKA session. Accordingly, in many instances, such a delay before detecting that a peer has been disconnected from a MACsec communication link may result in delays in network convergence, communication failure, packet data loss, traffic blackholing, and/or the like for extended periods of time. Furthermore, the peer liveness messages may not be transmitted through a control channel of a MACsec communication link of the MKA session. Accordingly, secure keys programmed by the MKA daemons of the network devices may not be validated by the peer liveness messages and one of the network devices may include expired entries, due to failures, for an extended period of time. In some systems, where MKA sessions are held on a relatively large number of ports (e.g., more than 40 ports), responsiveness of the control plane may decrease due to the high scale. Further, increasing the transmit intervals using standard peer liveness messages between MKA daemons of MKA devices to address these issues may cause failures as a control plane of the MKA session may not be able to handle the increased load.

To address these issues, a fast heartbeat protocol may be performed during an MKA session between packet processing engines of MKA devices, rather than between MKA daemons at the top of a stack of elements of MKA devices. The fast heartbeat protocol messages may be exchanged between MKA devices at a faster rate than standard peer liveness messages of MKA sessions (e.g., approximately every half second (0.5 seconds)). Additionally, in some instances, the fast heartbeat protocol may lessen a period of time for peer liveness messages (referred to herein as fast heartbeat messages) to reach peer MKA devices as the packet processing engines may be located closer to a network interface control (NIC) in the stack of the MKA devices, and thus may be closer to the "outside world," than the MKA daemons of the MKA devices. Additionally, or alternatively, a fast heartbeat timeout threshold may be implemented to be less than a period of time of an MKA timeout interval of MKA sessions. In some implementations, the fast heartbeat messages may be transmitted as controlled packets through the secured channels of MACsec (and thus may not need to be encrypted/decrypted because the fast heartbeat messages are sent or received via the secured channels of MACsec), thus ensuring that the secure path is validated and there is no overhead for encrypting frames (unlike a standard MKA control path).

In an MKA session implementing a fast heartbeat session, liveness messages exchanged via MKA daemons during an MKA session being transmitted may be redundant as the fast heartbeat session monitors liveness of the MKA session. As such, some implementations herein enable placing an MKA protocol in a pause state that suspends transmission of MKA packet data (e.g., MKA protocol data units (PDUs)) and/or suspends a timeout timer associated with the timeout interval of the MKA session. As such, liveness may be maintained by a component, other than the MKA daemon, that is lower in the stack (e.g., a packet processing engine) of the network device. Furthermore, in some implementations the MKA protocol of the MKA daemon may be activated for configuration of the MKA session, for generating one or more keys for the MKA session, and/or for any other purposes of maintaining the security of the MKA session.

Accordingly, some implementations described herein conserve computing resources of a network device by preventing the network device from generating and/or sending unnecessary packets for liveness communications of an MKA session. The conserved computing resources may allow for increased scalability of MACsec communication links in a control plane a network device as the network device may be able to handle and maintain an increased amount of MKA sessions. Furthermore, some implementations may conserve network resources by eliminating unnecessary transmissions of MKA packet data of an MKA session between MKA devices, as the fast heartbeat messages are used to more effectively monitor liveness of the MKA session.

As used herein, a packet may refer to a communication structure for communicating information, such as a PDU, a frame, a datagram, a segment, a message, a block, a cell, a frame, a subframe, a slot, a symbol, a portion of any of the above, and/or another type of formatted or unformatted unit of data capable of being transmitted via a network.

Figure 1B:
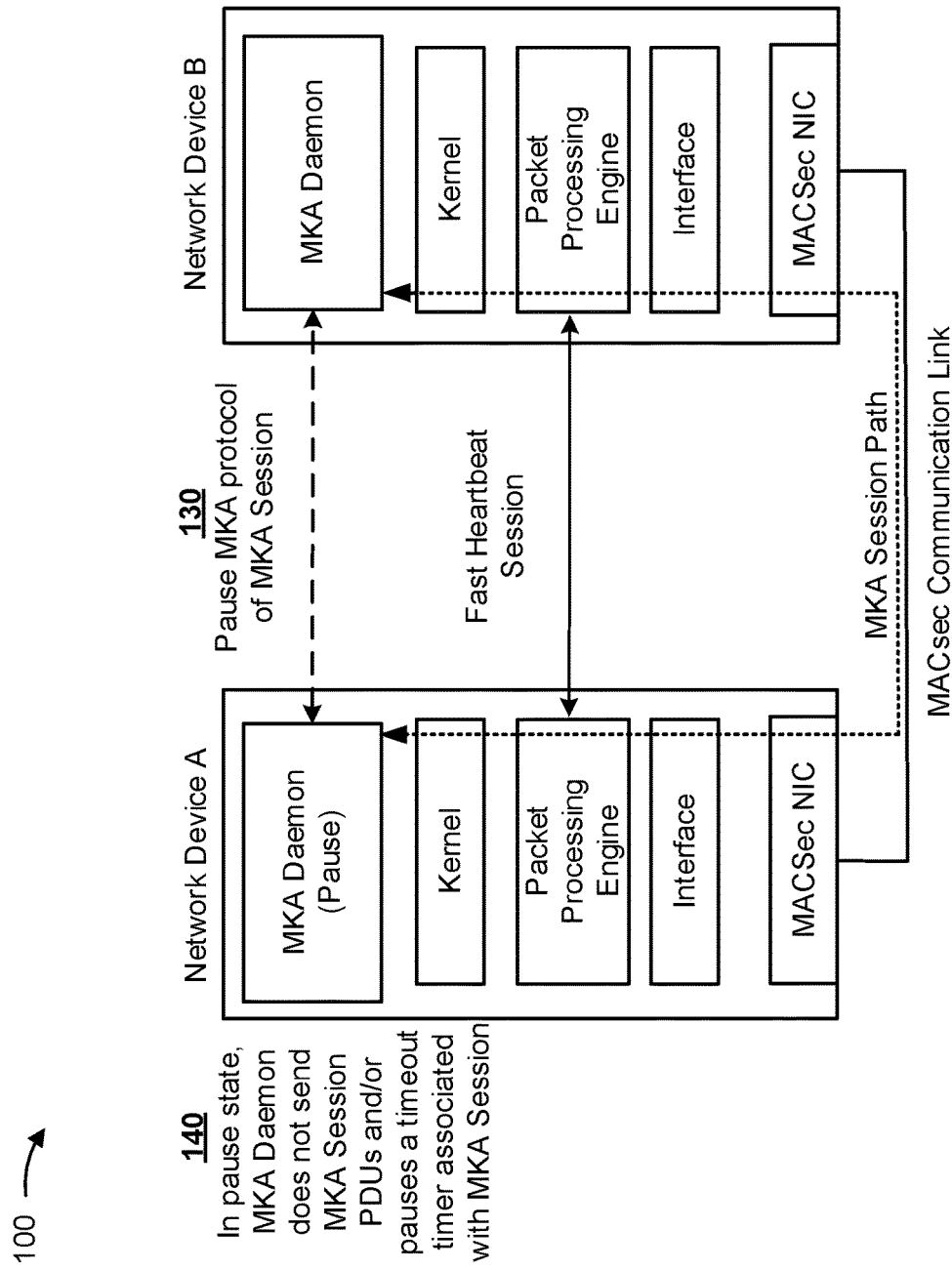
Figure 1C:
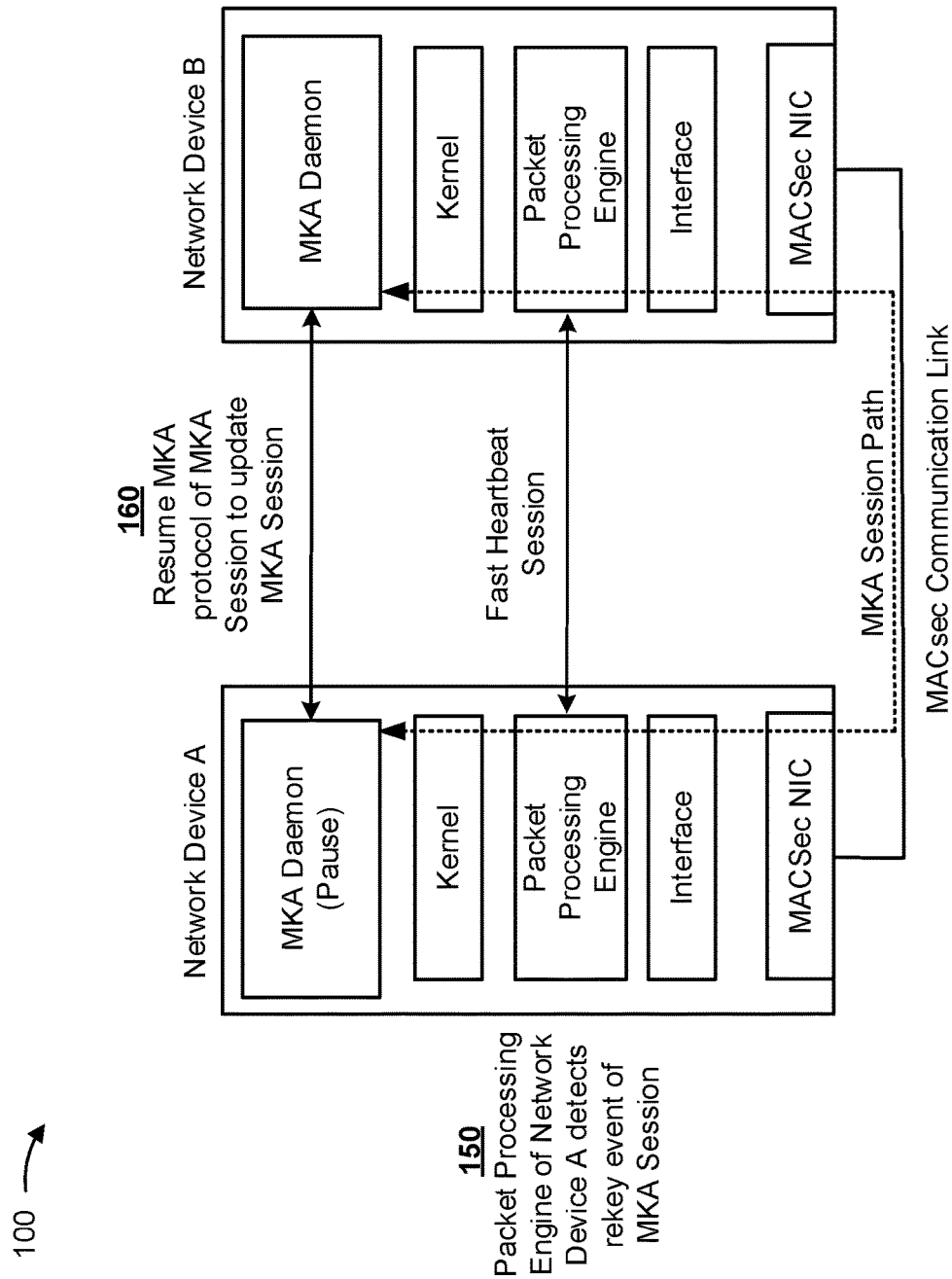

FIGS. 1A-1C are diagrams of an overview of an example implementation 100 described herein. Example implementation 100 shows a network device A and a network device B in communication via a MACsec communication link. As shown in FIGS. 1A-1C, network device A and network device B include an MKA stack. In the example implementation 100, the MKA stacks of network device A and network device B include an MKA daemon, a kernel, a packet processing engine, an interface, and a MACsec network interface controller (NIC).

In the MKA stack of the example implementation 100 of FIGS. 1A-1C, the MKA daemon includes a process or program operating in the background of the network device to exchange MKA communications (e.g., packets) with MKA enabled devices. The kernel includes a program that operates to translate packet data between the packet processing engine and the MKA daemon. The packet processing engine performs packet switching and/or routing of MKA packet data, such as extensive authentication protocol over local area network (EAPoL) packets. The interface serves as a software interface between the MACsec NIC and network device/packet processing engine. The MACsec NIC serves as the hardware interface between the network device (e.g., network device A and network device B) and a network (e.g., a network of the MACsec communication link).

In example implementation 100, data may be exchanged via an MKA session path. As shown in FIGS. 1A-1C, the MKA session path is between MKA daemons of network device A and network device B and goes through each element in the MKA stacks (e.g., the MACsec NIC, the interface, the packet processing engine, and the kernel) of network device A and network device B.

As shown in FIG. 1A and by reference number 110, an MKA session may be established between network device A and network device B. During the MKA session, MKA packet data (e.g., peer liveness messages) may be scheduled to be sent periodically between the MKA daemons (e.g., every 2 seconds or more) via the MKA session path (e.g., according to a standard). As shown by reference number 120, a fast heartbeat session associated with the MKA session is established between network device A and network device B (e.g., after the MKA session is established). As shown in FIG. 1A the fast heartbeat session is established between the packet processing engines of network device A and network device B for the MKA session. In some implementations, the packet processing engines may send fast heartbeat messages at a fast heartbeat exchange interval (e.g., every 0.5 seconds) that is shorter than a scheduled exchange interval between sending MKA packet data in the MKA session.

As shown in FIG. 1B, and by reference number 130, the MKA protocol of the MKA session is paused between network device A and network device B. For example, one or both of network device A or network device B may pause MKA daemons or processes of the MKA session. As shown by reference number 140, in the pause state, the MKA daemon of network device A (and/or of network device B) does not send MKA packet data and pauses a timeout timer associated with the MKA session. Additionally or alternatively, network device A (and/or network device B) may suspend or pause a timeout timer associated with sending liveness messages for the MKA session from network device B. Accordingly, because the MKA packet data (which serve as liveness messages) of the MKA session are not to be transmitted and/or monitored for receipt, while the MKA session is in the pause state, the fast heartbeat session between the packet processing engines of network device A and network device B is used to monitor liveness of the MKA session and maintain the MKA session. In some implementations, the MKA protocol of the MKA session may be paused before the fast heartbeat session is established. Accordingly, in such cases, the MKA session may be established between network device A and network device B and transmissions via the MKA protocol may be paused when the fast heartbeat session is established.

As shown in FIG. 1C, and by reference number 150, the packet processing engine of network device A detects a rekey event of the MKA session. For example, the rekey event may indicate keys of the MKA session are to be regenerated and/or cause keys (e.g., encryption keys and/or decryption keys) of the MKA session to be regenerated for the MKA session. In such an example, the rekey event may include a packet number (e.g., a number of packets transmitted and/or received) of network device A satisfying a packet exhaustion threshold. A packet exhaustion threshold may correspond to a number of packets that may be transmitted for a given set of keys of an MKA session (e.g., before the keys are to be regenerated). As another example, the rekey event may be a receipt, by network device A, of an EAPoL from network device B (e.g., which may indicate that a packet number of network device B reached (or exceeded) a packet exhaustion threshold). In such instances, as shown by reference number 160, the MKA protocol of the MKA session is resumed. Accordingly, once resumed, network device A (and/or network device B) may rekey and/or reconfigure the MKA session. In some implementations, after a period of time (e.g., a period of time corresponding to addressing the rekey event, and/or a period of time associated with reconfiguring the MKA session), the MKA protocol of the MKA session may be placed back into a pause state, as described herein.

Accordingly, network device A (and/or network device B), in the example implementation 100 of FIGS. 1A-1C may preserve network resources by utilizing fast heartbeat liveness messages to monitor liveness of an MKA session and by avoiding generating and/or transmitting redundant MKA protocol communications (e.g., MKA packet data as liveness messages) between network device A and network device B when the MKA session is in the pause state.

As indicated above, FIGS. 1A-1C are provided merely as an example. Other examples are possible and may differ from what was described with regard to FIGS. 1A-1C.

Figure 2:
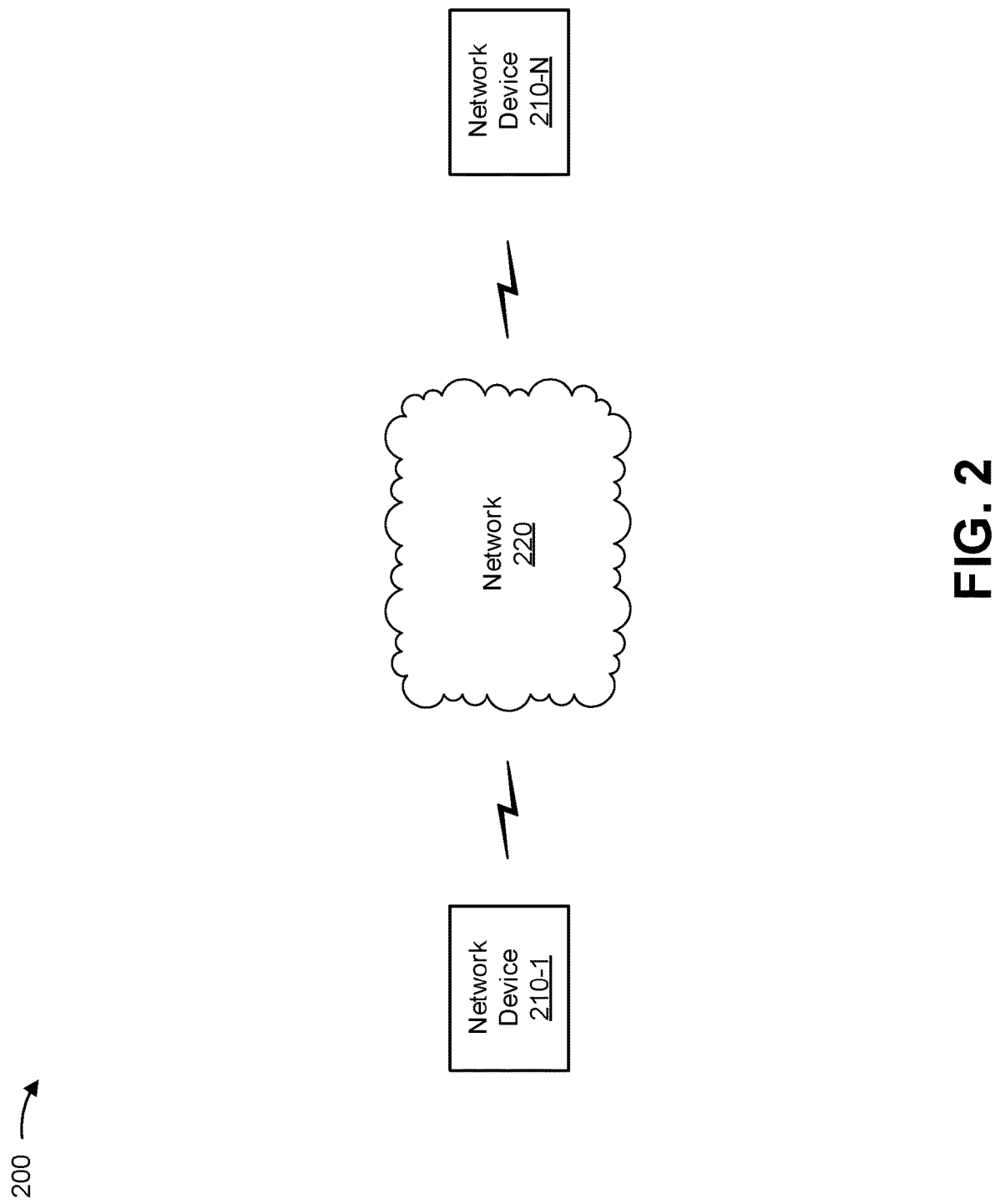
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as "network devices 210," and individually as "network device 210") and a network 220. Devices of environment 200 may interconnect via wired connections, wireless connections, or a combination of wired and wireless connections.

Network device 210 includes one or more devices (e.g., one or more traffic transfer devices) capable of processing and/or transferring network traffic. For example, network device 210 may include a firewall, a router, a gateway, a switch, a hub, a bridge, a reverse proxy, a server (e.g., a proxy server), a security device, an intrusion detection device, a load balancer, or a similar device. According to some implementations herein, network device 210 is capable of establishing MKA sessions and/or communicating via MKA sessions with other network devices 210, as described herein.

In some implementations, network device 210 may be a physical device implemented within a housing, such as a chassis. In some implementations, network device 210 may be a virtual device implemented by one or more computer devices of a cloud computing environment or a data center.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
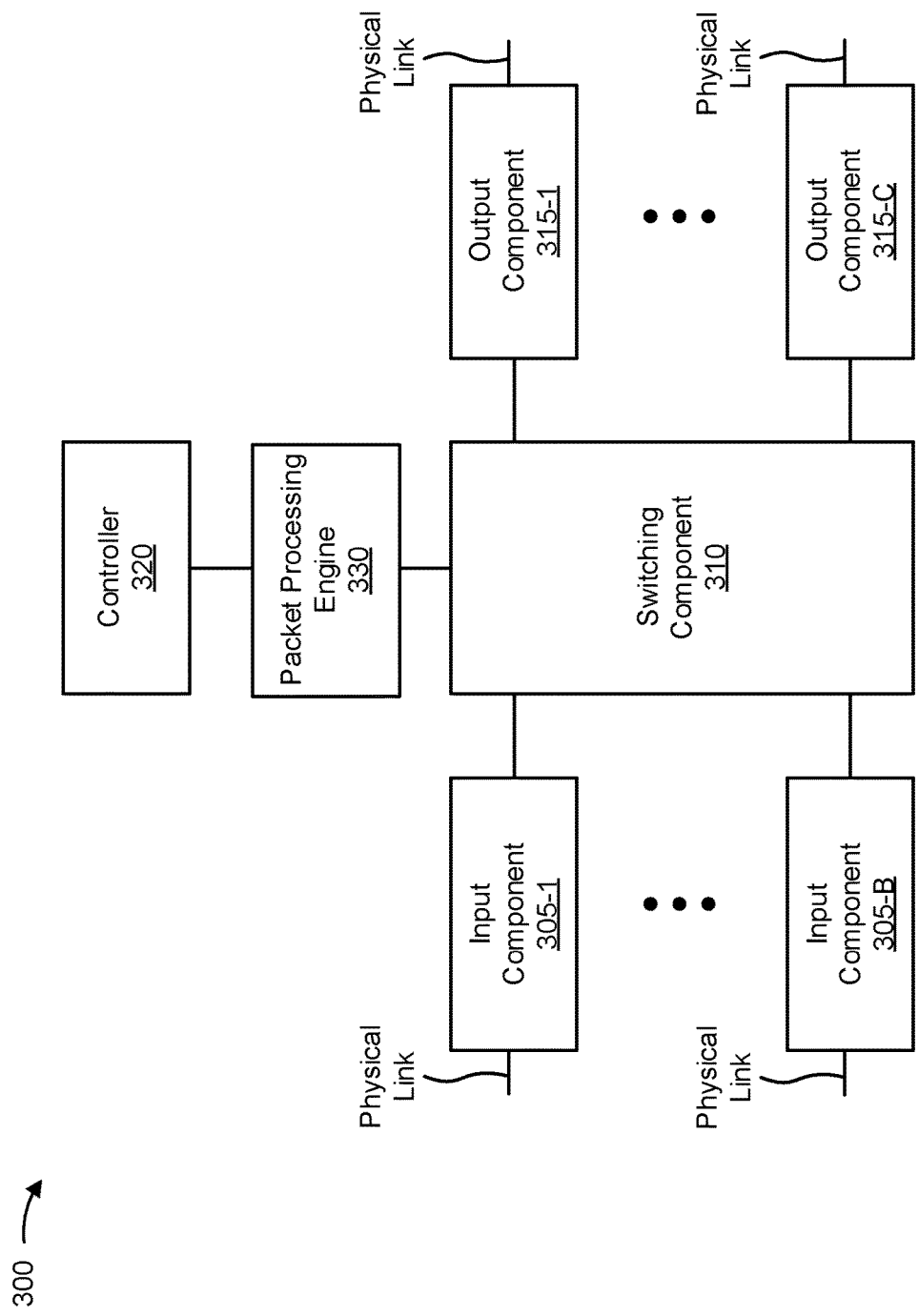
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), a controller 320, and a packet processing engine 330.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

Packet processing engine 330 may perform packet switching and/or routing of packet data units. For example, packet processing engine 330 may perform packet switching and/or routing of MKA packet data (e.g., EAPoL packet data). Packet processing engine 330 may perform Layer 2 and Layer 3 packet switching. As shown in FIG. 3, packet processing engine 330 is connected with switching component 310 (e.g., via a physical interface card (PIC)). In some implementations, packet processing engine 330 may be implemented by or collocated with controller 320, a line card, input components 305, switching component 310, and/or output components 315.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
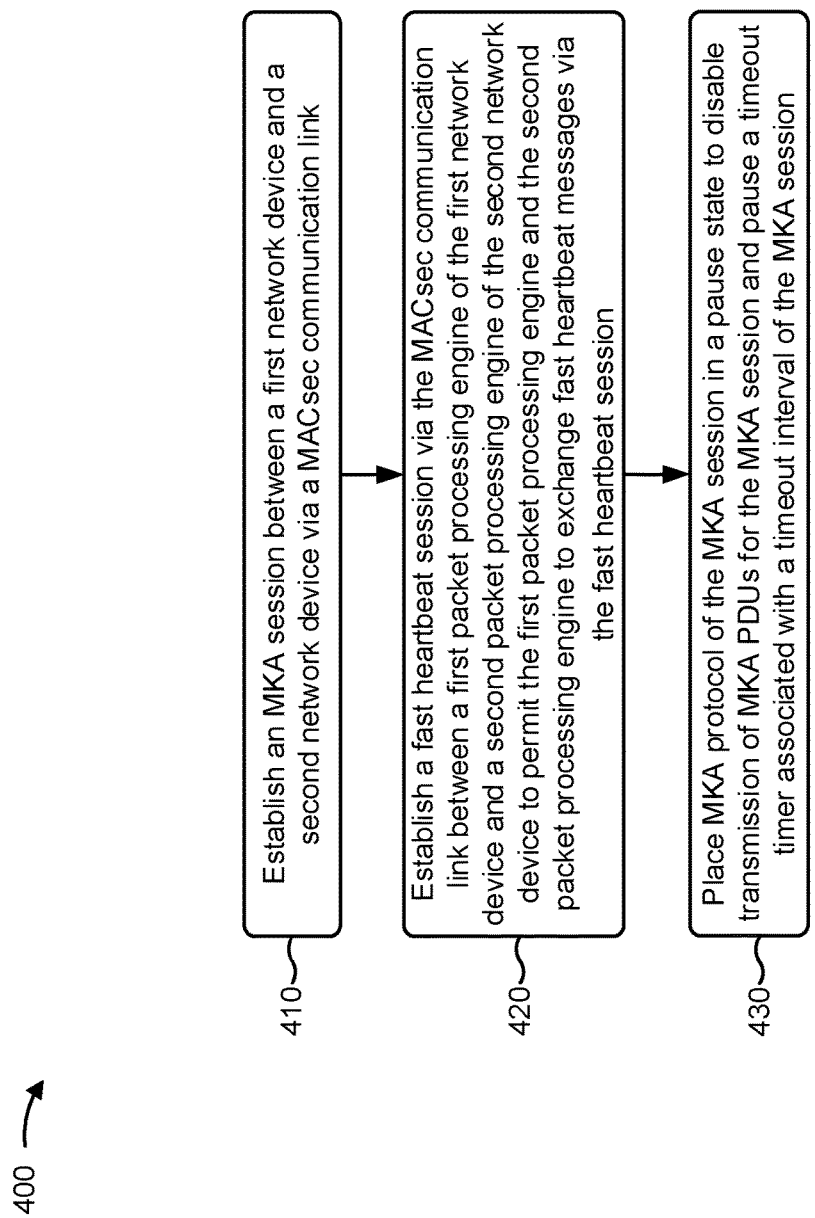
FIG. 4 is a flow chart of an example process for pausing a media access control security (MACsec) key agreement (MKA) protocol of an MKA session using a fast heartbeat session associated with the MKA session.

FIG. 4 is a flow chart of an example process 400 for pausing an MKA protocol of an MKA session using a fast heartbeat session associated with the MKA session. In some implementations, one or more process blocks of FIG. 4 may be performed by network device 210-1. In some implementations, one or more process blocks of FIG. 4 may be performed by another device or a group of devices separate from or including network device 210-1, such as another network device 210 or another device in communication with network 220.

As shown in FIG. 4, process 400 may include establishing an MKA session between a first network device and a second network device via a MACsec communication link (block 410). For example, network device 210-1 may establish the MKA session between network device 210-1 and network device 210-N. In some implementations, network device 210-1 may establish the MKA session based on an event or trigger to cause an exchange of data via an MKA session, based on a user input (e.g., request to exchange data), based on the network device 210-1 being placed in communication with network device 210-N, and/or the like.

In some implementations, as described herein, an MKA session is a communication session that exchanges MKA packet data, such as EAPoL packets. The MKA packet data may include context specific information, such as message number (MN), member identification (ID), packet number (e.g., corresponding to a number of packets transmitted or received in the MKA session and/or a number of packets that are monitored corresponding to a packet exhaustion threshold), packet identification number (PIN), and/or the like. A periodic exchange of the MKA packet data according to an MKA protocol may keep the MACsec communication link in tact until a timeout interval (e.g., a time period during which MKA packet data are not exchanged between the network devices 210) expires.

During MKA sessions, MKA packet data may enter network device 210-1 via a stack to reach an MKA daemon.

For example, MKA packet data may enter network device 210-1 via a MACsec NIC, continue through an interface driver, a packet processing engine, and/or a kernel to reach the MKA daemon, which may respond with MKA packet data back through the stack that exit from the MACsec NIC to another network device 210-N.

In some implementations, network device 210-1 may establish the MKA session using the MKA packet data according to an MKA protocol. For example, network device 210-1 may exchange a series of MKA protocol packets with network device 210-N to configure and/or establish the MKA session. In such cases, the MKA packet data may indicate which of network device 210-1 or network device 210-N is to be a key server of the MKA session (e.g., a network device of the MKA session responsible for generating or regenerating keys for the MKA session). In some implementations, the MKA session may be established based on network device 210-1 and/or network device 210-N establishing keys for the MKA session between network device 210-1 and network device 210-N.

In this way, network device 210-1 may establish an MKA session via a MACsec communication link, which may enable network device 210-1 to establish a fast heartbeat session via the MACsec communication link, as described below.

As further shown in FIG. 4, process 400 may include establishing a fast heartbeat session via the MACsec communication link between a first packet processing engine of the first network device and a second packet processing engine of the second network device to permit the first packet processing engine and the second packet processing engine to exchange fast heartbeat messages via the fast heartbeat session (block 420). For example, network device 210-1 may establish the fast heartbeat session between a packet processing engine 330 of network device 210-1 and a packet processing engine 330 of network device 210-N. In some implementations, network device 210-1 may establish the fast heartbeat session based on the MKA session being established. In some implementations, the fast heartbeat session may be established by sending the fast heartbeat message, receiving a reply fast heartbeat message, being configured to send or receive fast heartbeat messages, and/or the like.

In some implementations, the fast heartbeat session enables exchange of fast heartbeat messages at an increased rate relative to the exchange of MKA packet data of the MKA session. For example, the fast heartbeat session may involve network devices 210 exchanging fast heartbeat messages at a fast heartbeat exchange interval of at least every half second (e.g., every 0.5 seconds, at a rate faster than every 0.5 seconds, etc.) via packet processing engines 330, while the MKA session may involve network devices 210 exchanging MKA packet data every two seconds. As used herein, the length of time between sending, receiving, or exchanging fast heartbeat messages may be referred to as a fast heartbeat exchange interval.

In some implementations, network devices 210 may send out fast heartbeat messages at a layer lower than the MKA daemon in the MKA stack (e.g., from the kernels, the packet processing engines, the interface drivers, or the MACsec NICs of network devices 210). In some implementations, the fast heartbeat messages may be sent by the packet processing engines 330 of network devices 210. The fast heartbeat messages may be sent via a fast heartbeat session. In some implementations, the fast heartbeat session may utilize a secure channel of the MACsec communication link. Accordingly, network devices 210 may use the fast heartbeat messages to validate the secure channel without any overhead of encrypting fast heartbeat messages or data to/from layers of the stack higher than the packet processing engine 330 (e.g., an MKA daemon or kernel), thus conserving resources of network devices 210. In some instances, MKA packet data may not be used to validate a secure channel as the MKA packet data may not be exchanged via a secure channel of the MACsec communication link.

According to some implementations, the fast heartbeat session may be used to monitor a liveness of the MKA session (e.g., to determine that an MKA session is up or that the MKA session has ended). Accordingly, when network device 210-1 determines that a fast heartbeat exchange interval (e.g., a length of time between receiving fast heartbeat messages) satisfies a fast heartbeat timeout threshold (e.g., a threshold period of time indicating a timeout or disconnection of the MKA session), then network device 210-1 may determine that the MKA session with network device 210-N has ended.

During a fast heartbeat session, packet processing engines 330 of network devices 210 may synchronously or asynchronously transmit fast heartbeat messages. The fast heartbeat messages may include message frames. For example, the message frames may include a destination address field, a source address field, an ether type field, a frame type field, a length field, a secure channel identifier (SCI) field, a member identifier field, a message number (MN) field, and/or a connectivity association key (CAK) name (CKN) field.

In some implementations, network device 210-1 may establish the fast heartbeat session based on an MKA timeout interval being reached. For example, when MKA packet data has not been received by network device 210-1 after an MKA timeout interval (e.g., over two seconds, over 6 seconds), network device 210-1 may establish the fast heartbeat session.

In some implementations, network device 210-1 may establish or end the fast heartbeat session based on a status of an MKA session. For example, if the MKA session exchanges MKA packet data at an established interval (e.g., every two seconds) for a period of time, then network device 210-1 may end or deactivate the fast heartbeat session for the MKA session. Network device 210-1 may then reestablish the fast heartbeat session if MKA packet data are not received at the established interval for a period of time (e.g., by resending fast heartbeat messages). Accordingly, network device 210-1 may be triggered to establish the fast heartbeat session based on not receiving data of the MKA session (or data on the MACsec communication link).

In this way, network device 210-1 may establish a fast heartbeat session, which enables packet processing engines 330 of the network devices 210 to exchange fast heartbeat messages at an increased rate relative to MKA packet data of the MKA session.

As further shown in FIG. 4, process 400 may include placing MKA protocol of the MKA session in a pause state to disable transmission of MKA packet data of the MKA session and pause a timeout timer associated with a timeout interval of the MKA session (block 430). For example, network device 210-1 may place the MKA protocol in the pause state. In some implementations, network device 210-1 may place the MKA protocol in the pause state based on establishing the MKA session, based on receiving configuration information for the MKA session, based on receiving a fast heartbeat message, and/or the like. In some implementations, the MKA protocol may be placed in the pause state until a rekey event for the MKA session is detected.

In some implementations, network device 210-1 may place the MKA protocol in a pause state via the packet processing engine 330 sending a notification or request to an MKA daemon of network device 210-1 to suspend operations associated with the MKA protocol. Accordingly, packet processing engine 330 of network device 210-1 may cause the MKA protocol to be placed in a paused state.

According to some implementations, when MKA protocol is in a pause state, network devices 210 may alter operations associated with the MKA protocol of the MKA session. For example, when in the pause state, one or more operations of an MKA daemon (or other component) of network device 210-1 may not generate or send MKA packet data according to the MKA protocol. In such instances, packet processing engine 330 of network device 210-1 may cause the MKA daemon to suspend generating or sending the MKA packet data or cause the MKA daemon to be unable to send the MKA packet data according to the MKA protocol. Accordingly, in some implementations, MKA daemons of network devices 210 may not be used to monitor the liveness of the MKA session. In such cases, the liveness of the MKA session may be monitored by packet processing engines 330 using fast heartbeat messages of a fast heartbeat session.

Additionally, or alternatively, while the MKA protocol is in the pause state, the MKA daemons of network devices 210 may suspend a timeout timer associated with a timeout interval of the MKA session. For example, because MKA daemons of network devices 210 are not to receive MKA packet data (e.g., from other network devices 210) for monitoring liveness of the MKA session, the MKA daemons of the network devices 210 may suspend the timeout interval associated with the timeout of the MKA session. Accordingly, because the timeout interval is not needed for liveness, presumed errors associated with MKA session based on the timeout interval expiring may be avoided. However, in such instances, packet processing engines 330 may continue using a timer associated with a fast heartbeat timeout threshold (e.g., because the packet processing engines 330 of network devices 210 are used to track liveness of the MKA session).

Accordingly, when in MKA protocol for an MKA session is placed in a paused state, an MKA session (e.g., liveness) may be monitored and/or maintained by a component, other than the MKA daemon, that is lower in the stack (e.g., a packet processing engine) of network device 210-1. In this way, network device 210-1 may place the MKA protocol (e.g., for MKA daemons) in a pause state to enable packet processing engine 330 of network device 210-1 to monitor the fast heartbeat session and the MKA session.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
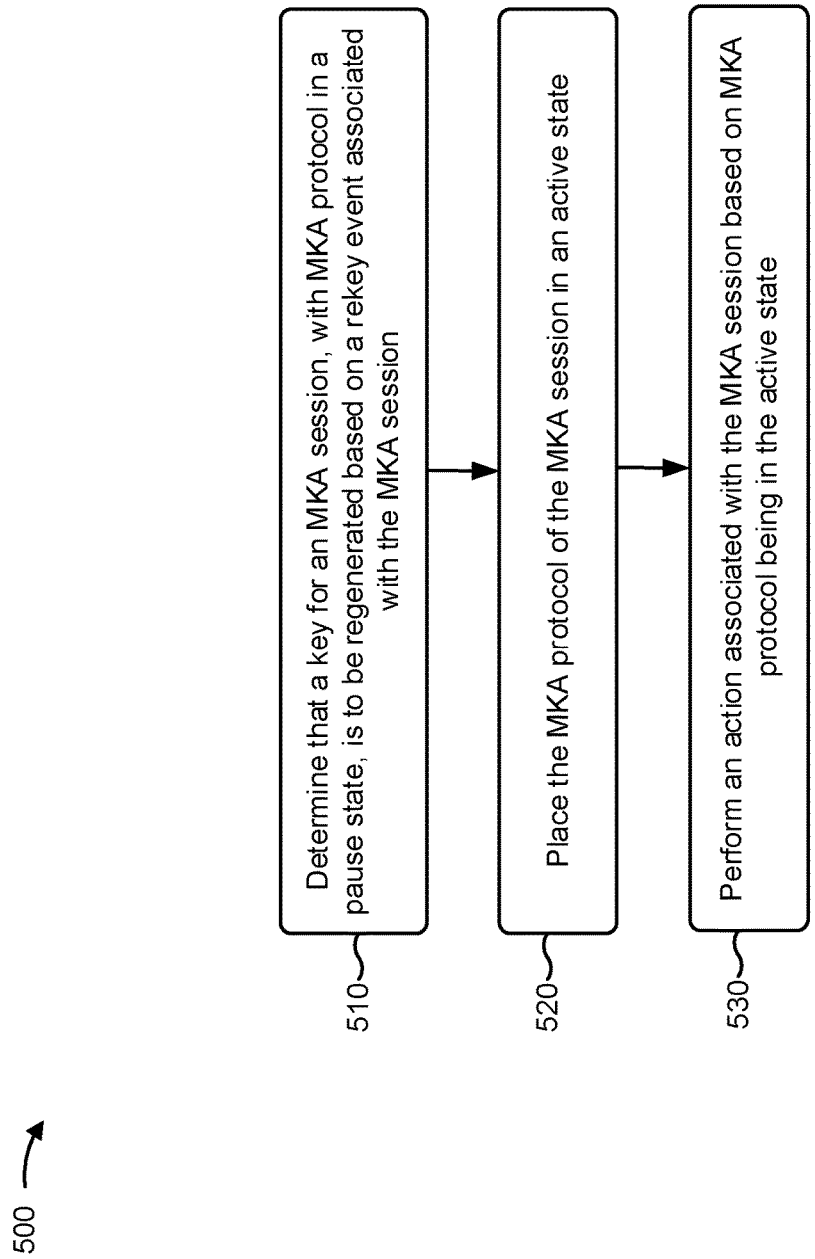
FIG. 5 is a flow chart of an example process for resuming an MKA protocol of an MKA session after the MKA protocol of the MKA session is paused.

FIG. 5 is a flow chart of an example process 400 for resuming an MKA protocol of an MKA session after the MKA protocol of the MKA session is paused. In some implementations, one or more process blocks of FIG. 4 may be performed by network device 210-1. In some implementations, one or more process blocks of FIG. 4 may be performed by another device or a group of devices separate from or including network device 210-1, such as another network device 210 or another device in communication with network 220.

As shown in FIG. 5, process 500 may include determining that a key for an MKA session, with MKA protocol in paused state, is to be regenerated based on a characteristic of the MKA session (block 510). For example, network device 210-1 (e.g., via packet processing engine 330) may determine that one or more keys for the MKA session are to be regenerated. In some implementations, network device 210-1 may determine that the key for the MKA session is to be regenerated based on receiving or identifying the characteristic of the MKA session or the characteristic of the fast heartbeat session.

According to some implementations, a key (e.g., for encryption and/or decryption of messages) of an MKA session is to be regenerated (e.g., by generating a new key value). For example, network device 210-1 may determine that one or more keys are to be regenerated based on detection of a rekey event associated with causing generation of a new or updated value for the key. As such, an example rekey event associated with the MKA session corresponds to an event that is to cause the key of the MKA session to be regenerated. In some implementations, a rekey event may include network device 210-1 (e.g., by packet processing engine 330) transmitting and/or receiving a threshold number of packets via an MKA session, such that the packet number for the MKA session satisfies the packet exhaustion threshold. For example, after a threshold number of packets (e.g., ten, one hundred, one thousand, and/or the like) are received by network device 210-1 (e.g., as determined by packet processing engine 330), the rekey event occurs and the network device 210-1 is to determine that a key for the MKA session is to be regenerated. In some implementations, the rekey event may correspond to a scheduled rekey event (e.g., which may be defined based on a setting of network device 210-1, a standard, a user input, and/or the like) that is to cause network device 210-1 to regenerate the key.

In some implementations, the rekey event may correspond to a receipt of MKA packet data from a peer of the MKA session. For example, network device 210-1 (e.g., via packet processing engine 330) may receive MKA packet data from network device 210-N. In such cases, the MKA packet data from network device 210-N may indicate that network device 210-N is requesting that the key, for the MKA session between network device 210-1 and network device 210-N, be regenerated.

In this way, network device 210-1 may determine that a key for an MKA session is to be regenerated and facilitate regeneration of the key (e.g., by removing an MKA protocol from a paused state).

As further shown in FIG. 5, process 500 may include placing the MKA communication protocol of the MKA session in an active state (block 520). For example, network device 210-1 may place the MKA protocol in the active state. In some implementations, network device 210-1 (e.g., via packet processing engine 330) places the MKA protocol in the active state based on determining that the key for the MKA session is to be regenerated.

In some implementations, network device 210-1 places the MKA protocol in an active state via the packet processing engine 330 sending a notification to an MKA daemon to resume operation per the MKA protocol. For example, when in an active state, the MKA daemon of network device 210-1 resumes operation according to the MKA protocol (e.g., by performing a rekey of a key of the MKA session, by sending MKA packet data, and/or the like). As such, the MKA daemon may configure the MKA session, perform rekey process, send MKA packet data, and/or other operations according to the MKA protocol. Accordingly, packet processing engine 330 of network device 210-1 may cause the MKA protocol to be placed in an active state.

In this way, network device 210-1 may place an MKA protocol of an MKA session in an active state to enable network device 210-1 to perform an action associated with the MKA session.

As further shown in FIG. 5, process 500 may include performing an action associated with the MKA session (block 530). For example, network device 210-1 may perform the action. In some implementations, network device 210-1 may perform the action based on being placed in an active state (e.g., after being in a paused state, after the MKA session is established, and/or the like).

In some implementations, network device 210-1 may perform an action based on whether network device 210-1 is a key server or a client server of the MKA session. Network device 210-1 may be designated as the key server when network device 210-1 is the network device of the MKA session that is responsible for generating keys for the MKA session. For example, network device 210-1 may be the key server based on being designated as the peer to initiate the MKA session, based on instructions to be the key server from network device 210-N, based on the MKA protocol, and/or the like. Network device 210-1 may be the client server when network device 210-1 is not responsible for generating keys for the MKA session. For example, network device 210-1 may be designated as the client server based on being the peer to receive a request to establish the MKA session with another peer, based on a request from network device 210-N that network device 210-N be the key server, based on the MKA protocol, and/or the like.

In some implementations, when network device 210-1 is a key server of an MKA session (i.e., a peer of the MKA session that generates keys for the MKA session), the network device 210-1 may perform an action including performing a rekey process associated with the MKA session. A rekey process may involve generating or regenerating keys for the MKA session. For example, network device 210-1, via the MKA daemon, may generate or update keys for the MKA session according to the MKA protocol. As such, the MKA session may be continued further with updated keys for the MKA session. In some implementations, network device 210-1 may generate MKA packet data that includes the updated keys and send the MKA packet data to network device 210-N to indicate that the updated keys are to be used for the MKA session.

In some implementations, when network device 210-1 is a client server of an MKA session (i.e., a peer of the MKA session that does not generate keys for the MKA session), the network device 210-1 may perform an action including generating MKA packet data to be sent to network device 210-N (which may be the key server of the MKA session with network device 210-1). Additionally, or alternatively, network device 210-1 may perform an action that includes transmitting the MKA packet data to network device 210-N. In such instances, the transmitted MKA packet data may cause network device 210-N to perform a rekey of the keys of the MKA session between network device 210-1 and network device 210-N.

In this way, network device 210-1 may perform an action associated with the MKA session to maintain the MKA session after a rekey event.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
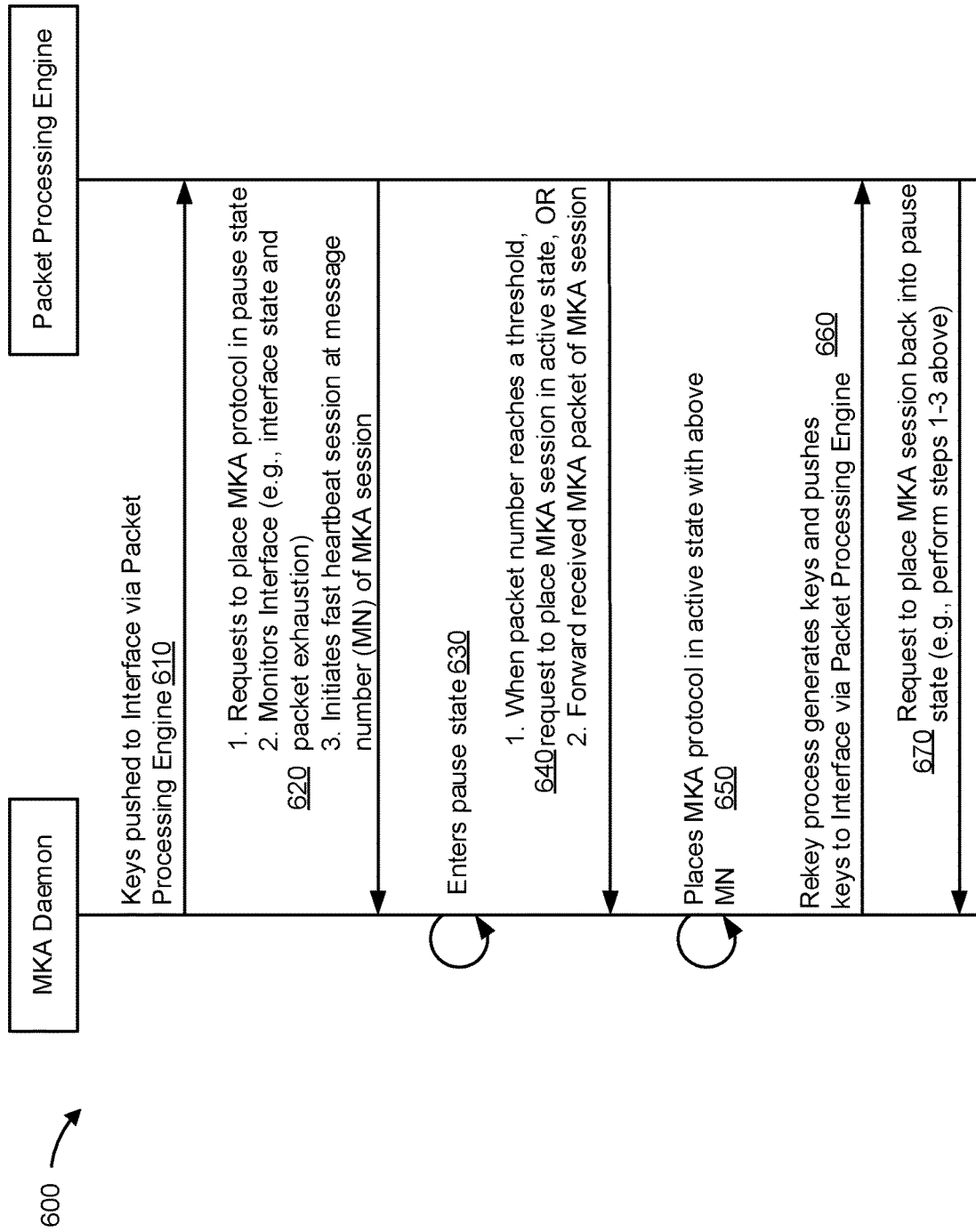
FIG. 6 is a message flow of an example implementation relating to the processes shown in FIGS. 4 and 5.

FIG. 6 shows an example message flow of an example implementation 600 relating to the example processes shown in FIGS. 4 and 5. The example implementation 600 indicates messages between an MKA daemon and a packet processing engine (e.g., a packet processing engine 330) of a network device 210. Messages of the example message flow of FIG. 6 may be used in placing an MKA protocol of an MKA session of a network device 210 in pause state and/or resuming the MKA protocol (e.g., by placing the MKA session in an active state) based on a key event.

As shown in FIG. 6, and by reference number 610, the MKA daemon pushes keys (e.g., MACsec keys) to the interface via the packet processing engine (e.g., to establish the MKA session). As shown by reference number 620, the packet processing engine (1) places the MKA protocol in a pause state, (2) monitors the interface (e.g., monitors the number of the packets received and/or transmitted via MKA session, monitors interface state (e.g., liveness, connectivity, activity, and/or the like), monitors fast heartbeat session, and/or the like), and (3) initiates the fast heartbeat session at the message number of the MKA session (e.g., the message amount of the MKA packet data that was most recently received and/or transmitted). As shown by reference number 630, the MKA daemon enters a pause state as the MKA protocol is paused.

As further shown in FIG. 6, and by reference number 640, the packet processing engine, when a packet number (e.g., corresponding to an amount of packets sent or received during the MKA session) reaches a threshold, requests to place the MKA session in an active state (e.g., when network device 210-1 of implementation 600 determines the packet number reaches the threshold). Alternatively, as shown by reference number 640, packet processing engine may forward received MKA packet data of the MKA session (e.g., when a network device other than the network device of example implementation 600 determines that the packet number is reached). As shown by reference number 650, based on the request to place the MKA protocol in the active state or receiving the forwarded MKA packet data, the MKA daemon places the MKA protocol in an active state with the message number of the MKA session (e.g., which corresponds to the message number when the MKA protocol was placed in the pause state). As shown by reference number 660, the MKA daemon performs a rekey process to generate keys and pushes the keys to the interface via the packet processing engine (e.g., similar to the message corresponding to reference number 610). As shown by reference number 670, packet processing engine may request to place the MKA session back into pause state (similar to steps 1-3 corresponding to reference number 620).

As indicated above, FIG. 6 is provided merely as an example. Other examples are possible and may differ from what was described with regard to FIG. 6.

Some implementations, described herein, enable pausing an MKA protocol of MKA daemons of an MKA session to allow a fast heartbeat session between packet processing engines (or components lower in stacks of network devices than the MKA daemons) to monitor and maintain the MKA session. As such, the MKA protocol may only be activated to enable configuration of the MKA session (e.g., establishing a key server for the MKA session, establishing a packet exhaustion threshold for the MKA session, and/or the like) and generation of keys, thus conserving computing resources and preventing delays in liveness communication by allowing the packet processing engine to monitor liveness of the MKA session using the fast heartbeat session. Furthermore, the conservation of resources may allow for increased scalability of MACsec communication links in the control plane. Moreover, network resources are conserved by preventing redundant transmissions of liveness messages (e.g., both MKA packet data transmitted for liveness and fast heartbeat messages for liveness).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors, communicatively coupled to the one or more memories, to:
establish a media access control security (MACsec) key agreement (MKA) session with another network device via a MACsec communication link,
where the MKA session exchanges MKA packet data between a MKA daemon of the network device and a MKA daemon of the other network device;
establish a fast heartbeat session via the MACsec communication link, between a first packet processing engine of the network device and a second packet processing engine of the other network device,
where the fast heartbeat session is to permit the first packet processing engine and the second packet processing engine to exchange fast heartbeat messages via the fast heartbeat session and the MACsec communication link, and
where the fast heartbeat session exchanges fast heartbeat protocol messages between MKA devices at a faster rate than standard peer liveness messages of MKA sessions;
place a MKA protocol of the MKA session in a pause state when the fast heartbeat session is established,
where the MKA protocol of the MKA sessions is placed in the pause state until the first packet processing engine detects a rekey event,
where the first packet processing engine, when the MKA protocol is in the pause state, is to:
cause the MKA daemon of the network device to suspend transmission of MKA packet data for the MKA session, and
cause the MKA daemon to suspend a timeout timer associated with the MKA session;
determine that a key for the MKA session is to be regenerated based on detection of the rekey event; and
perform an action based on the rekey event for the MKA session,
the action including placing the MKA protocol in an active state.

2. The network device of claim 1, where the one or more processors, are further to:
detect the rekey event based on an amount of packets, exchanged during the MKA session, approaching a packet exhaustion threshold associated with the MKA session.

3. The network device of claim 1, where the one or more processors are further to:
detect the rekey event based on receiving MKA packet data from the other network device,
where the MKA packet data indicates that the other network device is requesting that one or more keys for the MKA session are to be regenerated.

4. The network device of claim 1, where the rekey event comprises an amount of packets exchanged during the MKA session satisfying a packet exhaustion threshold, and
where the one or more processors, when performing the action, are further to:
generate one or more keys for the MKA session based on the MKA protocol being placed in the active state and the amount of packets satisfying the packet exhaustion threshold.

5. The network device of claim 1, where the rekey event comprises receiving MKA packet data from the other network device, and
where the one or more processors, when performing the action, are further to:
generate one or more keys for the MKA session based on the MKA protocol being placed in the active state and receiving the MKA packet data.

6. The network device of claim 1, where the rekey event comprises an amount of packets exchanged during the MKA session satisfying a packet exhaustion threshold,
where the one or more processors, when performing the action, are further to:
generate MKA packet data that indicates that the other network device is to perform a rekey process for the MKA session; and
transmit, to the other network device, the MKA packet data to cause the other network device to perform the rekey process for the MKA session.

7. The network device of claim 1, where the one or more processors, when performing the action, are to:
place the MKA protocol back into the pause state after the rekey event is addressed.

8. A non-transitory computer-readable medium storing instructions, the instructions comprising:
one or more instructions that, when executed by one or more processors of a network device, cause the one or more processors to:
establish a media access control security (MACsec) key agreement (MKA) session with another network device via a MACsec communication link,
where the MKA session exchanges MKA packet data between a MKA daemon of the network device and a MKA daemon of the other network device;
establish a fast heartbeat session via the MACsec communication link, between a first packet processing engine of the network device and a second packet processing engine of the other network device,
where the fast heartbeat session is to permit the first packet processing engine and the second packet processing engine to exchange fast heartbeat messages via the fast heartbeat session and the MACsec communication link, and
where the fast heartbeat session exchanges fast heartbeat protocol messages between MKA devices at a faster rate than standard peer liveness messages of MKA sessions;
place a MKA protocol of the MKA session in a pause state when the fast heartbeat session is established,
where the first packet processing engine, when the MKA protocol is in the pause state, is to:
cause the MKA daemon of the network device to suspend transmission of MKA packet data for the MKA session, and
cause the MKA daemon to suspend a timeout timer associated with the MKA session;
detect a rekey event associated with the MKA session;
determine that a key for the MKA session is to be regenerated based on detecting the rekey event; and
perform an action based on the rekey event for the MKA session,
the action including placing the MKA protocol in an active state.

9. The non-transitory computer-readable medium of claim 8, where the one or more instructions, when executed, further cause the one or more processors to:
monitor liveness of the MKA session based on the fast heartbeat session; and
determine that the MKA session has ended when a fast heartbeat exchange interval satisfies a fast heartbeat timeout threshold.

10. The non-transitory computer-readable medium of claim 8, where the rekey event occurring based on:
an amount of packets exchanged during the MKA session satisfying a packet exhaustion threshold.

11. The non-transitory computer-readable medium of claim 8, where the rekey event occurring based on:
receipt of MKA packet data from the other network device indicating that a rekey process is to be performed.

12. The non-transitory computer-readable medium of claim 8, where the one or more instructions, that cause the one or more processors to perform the action, cause the one or more processors to:
generate one or more keys for the MKA session based on the MKA protocol being placed in the active state and an amount of packets exchanged, the MKA session satisfying a packet exhaustion threshold.

13. The non-transitory computer-readable medium of claim 8, where the one or more instructions, that cause the one or more processors to perform the action, cause the one or more processors to:
generate MKA packet data that indicates that the other network device is to perform a rekey process for the MKA session; and
transmit, to the other network device, the MKA packet data to cause the other network device to perform the rekey process for the MKA session.

14. The non-transitory computer-readable medium of claim 8, where the one or more instructions, that cause the one or more processors to perform the action, cause the one or more processors to:
generate one or more keys for the MKA session based on the MKA protocol being placed in the active state and an amount of packets exchanged during the MKA session satisfying a packet exhaustion threshold;
generate MKA packet data that indicates that the one or more keys for the MKA session; and
transmit, to the other network device, the MKA packet data to cause the other network device to use the one or more keys for the MKA session.

15. A method, comprising:
establishing, by a network device, a media access control security (MACsec) key agreement (MKA) session with another network device via a MACsec communication link,
where the MKA session exchanges MKA packet data between a MKA daemon of the network device and a MKA daemon of the other network device;
establishing, by the network device, a fast heartbeat session via the MACsec communication link,
where the fast heartbeat session is to permit the network device and the other network device to exchange fast heartbeat messages via the fast heartbeat session and the MACsec communication link,
where the fast heartbeat session exchanges fast heartbeat protocol messages between MKA devices at a faster rate than standard peer liveness messages of MKA sessions; and
placing, by the network device, a MKA protocol of the MKA session in a pause state when the fast heartbeat session is established,
where the MKA protocol of the MKA sessions is placed in the pause state until a rekey event is detected;
suspending, by the network device and after the MKA protocol is placed in the pause state, transmission of MKA packet data for the MKA session;
suspending, by the network device, a timeout timer associated with the MKA session; and
performing, by the network device, an action based on the rekey event being detected, the action including placing the MKA protocol in an active state.

16. The method of claim 15, further comprising:
detecting the rekey event.

17. The method of claim 16, where the rekey event occurs based on an amount of packets exchanged during the MKA session satisfying a packet exhaustion threshold,
the method further comprising:
generating one or more keys for the MKA session based on the MKA protocol being placed in the active state and the amount of packets satisfying the packet exhaustion threshold.

18. The method of claim 16, where the rekey event occurs based on an amount of packets exchanged during the MKA session satisfying a packet exhaustion threshold,
the method further comprising:
generating one or more keys for the MKA session based on the MKA protocol being placed in the active state and the amount of packets satisfying the packet exhaustion threshold;
generating MKA packet data that indicates that the one or more keys for the MKA session to the other network device; and
transmitting, to the other network device, the MKA packet data to cause the other network device to use the one or more keys for the MKA session.

19. The method of claim 16, where the rekey event occurs based on receiving MKA packet data from the other network device,
the method further comprising:
generating one or more keys for the MKA session based on the MKA protocol being placed in the active state and receiving the MKA packet data.

20. The method of claim 15, where the rekey event occurs based on an amount of packets exchanged during the MKA session satisfying a packet exhaustion threshold,
the method further comprising:
generating MKA packet data that indicates that the other network device is to perform a rekey process for the MKA session; and
transmitting, to the other network device, the MKA packet data to cause the other network device to perform the rekey process for the MKA session.

\* \* \* \* \*